United States Patent
Gore et al.

(10) Patent No.: US 8,639,190 B2
(45) Date of Patent: Jan. 28, 2014

(54) PRECODING FOR SEGMENT SENSITIVE SCHEDULING IN WIRELESS COMMUNICATION SYSTEMS

(75) Inventors: Dhananjay Ashok Gore, San Diego, CA (US); Hemanth Sampath, San Diego, CA (US); Jibing Wang, San Diego, CA (US); Tamer Kadous, San Diego, CA (US); Gwendolyn D. Barriac, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 591 days.

(21) Appl. No.: 11/553,870

(22) Filed: Oct. 27, 2006

(65) Prior Publication Data

US 2007/0098099 A1 May 3, 2007

Related U.S. Application Data

(60) Provisional application No. 60/731,558, filed on Oct. 27, 2005.

(51) Int. Cl.
*H04B 1/00* (2006.01)
(52) U.S. Cl.
USPC ............ 455/69; 455/550.1; 455/73; 455/103; 455/115.1; 375/146; 375/221; 375/239; 375/302

(58) Field of Classification Search
USPC ........ 455/550.1, 424, 425, 456.5, 456.6, 561, 455/42, 17, 23, 69, 70, 78, 126, 103, 110, 455/115.1, 108, 39, 67.11, 73, 91, 101, 455/130; 375/146, 221, 239, 300, 302, 260, 375/267; 332/103, 118, 144, 162, 117
See application file for complete search history.

(56) References Cited

U.S. PATENT DOCUMENTS

| 6,002,942 | A | 12/1999 | Park |
| 6,456,669 | B1 * | 9/2002 | Sakoda .......................... 375/283 |
| 7,020,110 | B2 * | 3/2006 | Walton et al. ................. 370/334 |
| 7,372,830 | B2 * | 5/2008 | Jung et al. ..................... 370/328 |

(Continued)

FOREIGN PATENT DOCUMENTS

| JP | 2005509316 A | 4/2005 |
| JP | 2006503446 | 1/2006 |

(Continued)

OTHER PUBLICATIONS

Jihoon Choi et al, "Interpolation Based Transmit Beamforming for MIMO-OFDM with Limited Feedback", IEEE Communications Society, 2004, 249-253, Austin, Texas.

(Continued)

*Primary Examiner* — Tuan Pham
(74) *Attorney, Agent, or Firm* — Kenyon S. Jenckes

(57) ABSTRACT

Techniques to enhance the performance in a wireless communication system using segments called subbands and using precoding are shown. According to one aspect, the bandwidth for transmission to an access terminal is constrained to a preferred bandwidth which is less than the bandwidth available for transmission to an access terminal and precoding information related to the subcarriers within the constrained bandwidth is provided to a transmitter. The precoding information related to the subcarriers within a constrained bandwidth provides feedback about the forward link channel properties relative to different subbands and may be fed back on a channel associated with the bandwidth.

15 Claims, 6 Drawing Sheets

(56) References Cited

U.S. PATENT DOCUMENTS

| | | | |
|---|---|---|---|
| 7,466,964 B2* | 12/2008 | Sondur | 455/101 |
| 2003/0035495 A1* | 2/2003 | Laamanen et al. | 375/296 |
| 2003/0185310 A1* | 10/2003 | ketchum | 375/259 |
| 2004/0120347 A1* | 6/2004 | Lee et al. | 370/468 |
| 2004/0136349 A1 | 7/2004 | Walton et al. | |
| 2004/0190636 A1 | 9/2004 | Oprea | |
| 2005/0032521 A1* | 2/2005 | Lee et al. | 455/450 |
| 2005/0068884 A1* | 3/2005 | Yoon | 370/203 |
| 2005/0074080 A1* | 4/2005 | Catreux et al. | 375/347 |
| 2005/0101259 A1* | 5/2005 | Tong et al. | 455/69 |
| 2005/0147176 A1* | 7/2005 | Yun et al. | 375/260 |
| 2006/0052501 A1 | 3/2006 | Li | |
| 2006/0072677 A1* | 4/2006 | Kwak et al. | 375/260 |
| 2006/0109923 A1* | 5/2006 | Cai et al. | 375/260 |
| 2006/0159195 A1* | 7/2006 | Ionescu et al. | 375/267 |
| 2006/0209980 A1* | 9/2006 | Kim et al. | 375/267 |
| 2006/0245513 A1* | 11/2006 | Koo et al. | 375/267 |
| 2007/0149249 A1* | 6/2007 | Chen et al. | 455/561 |
| 2008/0049709 A1* | 2/2008 | Pan et al. | 370/344 |
| 2008/0069031 A1* | 3/2008 | Zhang et al. | 370/328 |
| 2008/0130612 A1* | 6/2008 | Gorokhov et al. | 370/342 |
| 2008/0181181 A1* | 7/2008 | Gorokhov et al. | 370/335 |
| 2009/0052381 A1* | 2/2009 | Gorokhov et al. | 370/329 |

FOREIGN PATENT DOCUMENTS

| | | |
|---|---|---|
| JP | 2006520109 | 8/2006 |
| RU | 2207723 C1 | 6/2003 |
| WO | 01/76110 A2 | 10/2001 |
| WO | WO03049397 | 6/2003 |
| WO | WO03058871 | 7/2003 |
| WO | 2006/052501 A1 | 5/2006 |

OTHER PUBLICATIONS

International Search Report and Written Opinion—PCT/US2006/042058, International Search Authority—European Patent Office—Mar. 23, 2007.

Hagiwara, Takashi, et al., "MIMO-OFDM Precoding based on a minimum bit error rate standard." Electronics Information Communication Institute Technical Report. Oct. 13, 2005, vol. 105, No. 356, pp. 49-54, URL: http://ci.nii.ac.jp/naid/10016766537.

Translation of Office Action in Japan application 2008-538009 corresponding to U.S. Appl. No. 11/553,870, citing Takashi, et al MIMO-OFDM pp. 49-54 Year 2005, WO03049397, JP2006503446, WO2003058871 and JP2006520109 dated Mar. 15, 2011.

Narieda S et al., "A Design Method of Optimal Precoder with Extrapolated MIMO Channel Fading Envelope," Transactions C of the Institute of Electrical Engineers of Japan, The Institute of Electrical Engineers of Japan, Nov. 1, 2004, vol. 124, No. 11, pp. 2376-2377.

* cited by examiner

PRECODING FOR SEGMENT SENSITIVE SCHEDULING IN WIRELESS COMMUNICATION SYSTEMS

CLAIM OF PRIORITY UNDER 35 U.S.C. §119

The present Application for Patent claims priority to Provisional Application No. 60/731,558 entitled "SEGMENT SENSITIVE SCHEDULING FOR PRECODING IN WIRELESS COMMUNICATION SYSTEM" filed Oct. 27, 2005, and assigned to the assignee hereof and hereby expressly incorporated by reference herein.

BACKGROUND

1. Field

The present description relates generally to wireless communication and more specifically to precoding in a wireless communication system.

2. Background

Wireless communication systems are widely deployed to provide various types of communication such as voice, data, and so on. These systems may be multiple-access systems capable of supporting communication with multiple access terminals by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems. Typically, a wireless communication system comprises several base stations, wherein each base station communicates with the mobile station using a forward link and each mobile station (or access terminal) communicates with base station using a reverse link.

A problem in many communication systems is the receiver is located in a specific portion of an area served by the access point. In such cases, where a transmitter has multiple transmit antennas, the signals provided from each antenna need not be combined to provide maximum power at the receiver. In these cases, there may be problems with decoding of the signals received at the receiver. One way to deal with these problems is by utilizing precoding.

Precoding is a spatial processing technique that improves the signal-to-noise ratio (SNR) of a wireless link with multiple antennas. Typically, precoding may be used at the transmitter in a multiple antenna system. Precoding provides many advantages in improving signal-to-noise ratios which improves the decoding of the signals by the receiver.

Certain types of OFDMA systems are frequency division duplexed (FDD) OFDMA systems. In these FDD OFDMA systems, the transmission from the access point to the access terminal and from the access terminal to the access point occupy different distinct frequency bands. In FDD OFDMA systems feedback to perform precoding generally requires knowledge of the channel at the transmitter, e.g. access point, which is not available without substantial feedback. This feedback, generally in the form of the actual weights or vectors, requires a large amount of resources on control or signaling channels. This reduces data rates and increases the overhead required.

Thus, there exists a need in the art for a system and/or a methodology to enhance the performance of precoding.

SUMMARY

The following presents a simplified overview or summary of one or more aspects in order to provide a basic understanding of such aspects. This summary is not intended to be an extensive overview of all contemplated aspects, and it is not intended to identify key or critical elements of all aspects nor is it intended to delineate the scope of any or all aspects. Its sole purpose is to present some concepts of one or more aspects in a simplified form as a prelude to the more detailed description that is presented later.

In an aspect, a wireless communication apparatus comprises a processor configured to decode signals that are received over two or more subcarriers of a segment of subcarriers, which is one of a plurality of segments of subcarriers available for communication, and to provide precoding information for at least one segment. In addition the apparatus comprises a transmitter configured to transmit the precoding information.

In another aspect, a method comprises receiving signals over two or more subcarriers of a segment of subcarriers, which is one of one or more segments of subcarriers. The method further comprises generating precoding information for at least one segment and transmitting the precoding information.

In a further aspect, an apparatus comprises means for receiving signals over two or more subcarriers of a segment of subcarriers, which is one of one or more segments of subcarriers. The apparatus further comprises means for generating precoding information for at least one segment and means for transmitting the precoding information.

In an aspect, a computer program product comprises a computer readable medium including instructions for receiving signals over two or more subcarriers of a segment of subcarriers, which is one of one or more segments of subcarriers. The medium further comprises instructions for generating precoding information for at least one segment and instructions for transmitting the precoding information.

BRIEF DESCRIPTION OF THE DRAWINGS

The features, nature, and advantages of the present aspects may become more apparent from the detailed description set forth below when taken in conjunction with the drawings in which like reference characters identify correspondingly throughout and wherein.

DETAILED DESCRIPTION

Figure 1:
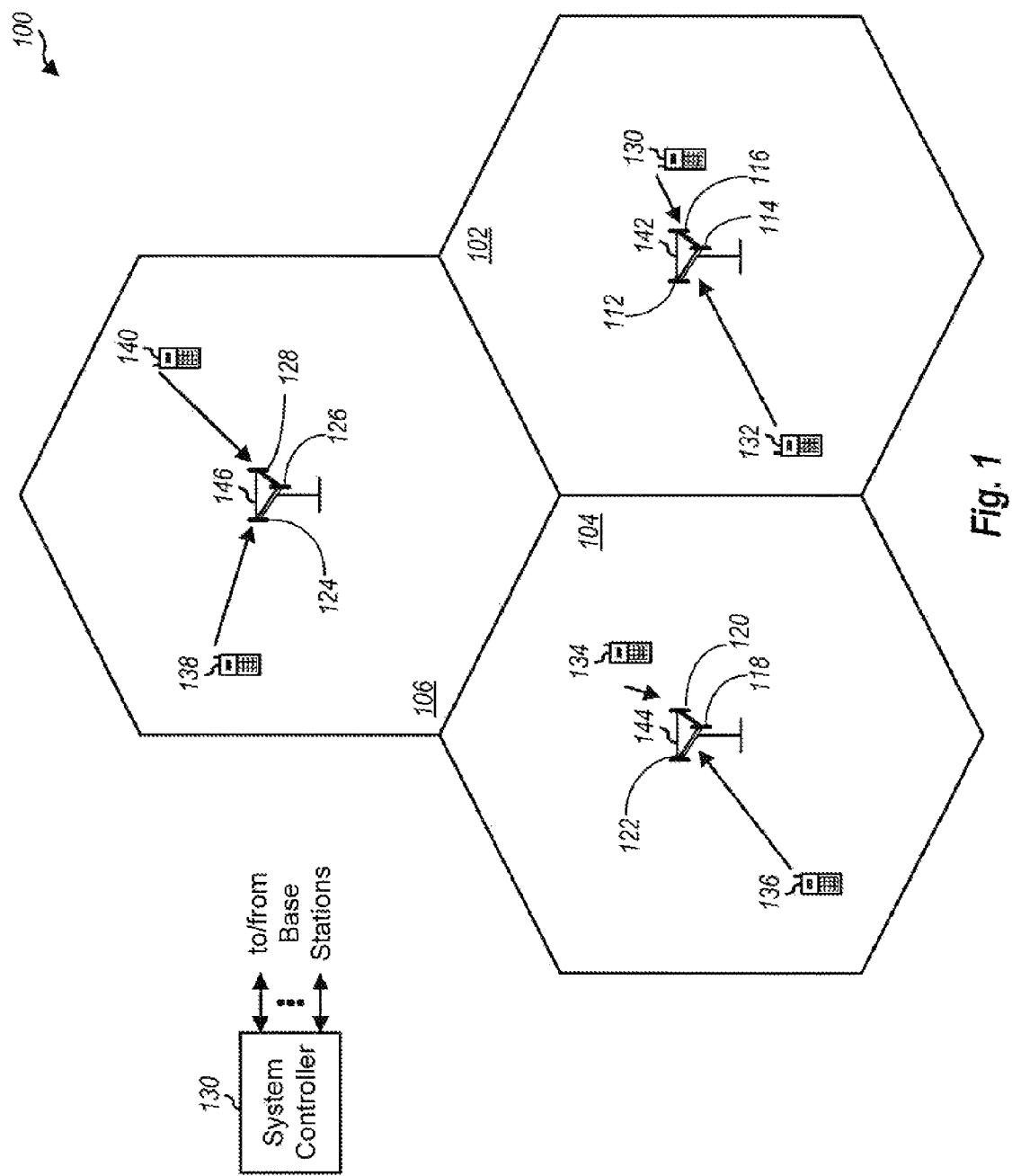
FIG. 1 illustrates aspects of a multiple access wireless communication system according to an aspect.

Various aspects are now described with reference to the drawings, wherein like reference numerals are used to refer to like elements throughout. In the following description, for purposes of explanation, numerous specific details are set forth in order to provide a thorough understanding of one or more aspects. It may be evident; however, that such aspect(s) may be practiced without these specific details. In other instances, well-known structures and devices are shown in block diagram form in order to facilitate describing one or more aspects.

As used in this application, the terms "component," "system," and the like are intended to refer to a computer-related entity, either hardware, a combination of hardware and software, software, or software in execution. For example, a component may be, but is not limited to, a processor, a process running on a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a user device. A user device can also be called a system, a subscriber unit, subscriber station, mobile station, mobile device, remote station, access point, base station, terminal, remote terminal, access terminal, user terminal, user agent, or user equipment. A user device can be a cellular telephone, a cordless telephone, a Session Initiation Protocol (SIP) phone, a wireless local loop (WLL) station, a PDA, a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Referring to FIG. 1, a multiple access wireless communication system according to one aspect is illustrated. A multiple access wireless communication system 100 includes multiple cells, e.g. cells 102, 104, and 106. In the aspect of FIG. 1, each cell 102, 104, and 106 may include an access point 150 that includes multiple sectors. The multiple sectors may be formed by groups of antennas each responsible for communication with access terminals in a portion of the cell. In cell 102, antenna groups 112, 114, and 116 each correspond to a different sector. In cell 104, antenna groups 118, 120, and 122 each correspond to a different sector. In cell 106, antenna groups 124, 126, and 128 each correspond to a different sector.

Each cell includes several access terminals which may be in communication with one or more sectors of each access point. For example, access terminals 130 and 132 are in communication base station 142, access terminals 134 and 136 are in communication with access point 144, and access terminals 138 and 140 are in communication with access point 146.

It can be seen from FIG. 1 that each access terminal 130, 132, 134, 136, 138, and 140 is located in a different portion of it respective cell relative to other access terminal in the same cell. Further, each access terminal may be a different distance from the corresponding antenna groups with which it is communicating. Both of these factors provide situations, due to environmental and other conditions in the cell, which cause different channel conditions to be present between each access terminal and the corresponding antenna group with which it is communicating.

Spatial multiplexing with linear precoding is a technique used to take advantage of the high spectral efficiency provided by multiple-input multiple-output (MIMO) systems or other multiple transmission antenna techniques. This can be implemented over frequency selective channels by using OFDM. In frequency division duplexing (FDD) systems the forward and reverse links are not reciprocal. Therefore, feedback of channel state information (CSI) at the transmitter in the form of precoding matrices is required. In MIMO-OFDM with preceding, a broadband channel is converted into multiple narrowband channels corresponding to OFDM subcarriers. The MIMO-OFDM transmitter requires feedback in the form of precoding matrices for the subcarriers. A general technique of precoding where the selection of an index that identifies the matrix(ces) or vector(s) comes from a defined codebook known to both the transmitter and receiver may be used. In some aspects the selection of the codebook entries may determined by selecting a matrix(ces) or vector(s), which provides a gain, signal-to-noise ratio (SNR), channel conditions, or the like that fulfills some criteria. In some cases, the criteria may be a best value, as determined by a device or system design. In another aspect, a threshold may be used to determine what matrix(ces) or vector(s) to select. In another aspect, an average of the channel criteria, e.g. SNR, for a subcarrier segment, e.g. a subband, is determined in order select a matrix(ces) or vector(s). In addition other channel criteria or combinations of multiple channel criteria may be utilized to select a matrix(ces) or vector(s).

As used herein, an access point may be a fixed station used for communicating with the terminals and may also be referred to as, and include some or all the functionality of, a base station, a Node, or some other terminology. An access terminal may also be referred to as, and include some or all the functionality of, a user equipment (UE), a wireless communication device, a terminal, a mobile station or some other terminology.

A MIMO design may have two modes of operation, single code word (SCW) and multiple-code word (MCW). In MCW mode, the transmitter can encode the data transmitted on each spatial layers, i.e. streams, independently, possibly with different rates. In a SCW mode design, the transmitter encodes the data transmitted on each spatial layer with "identical data rates."

Figure 2:
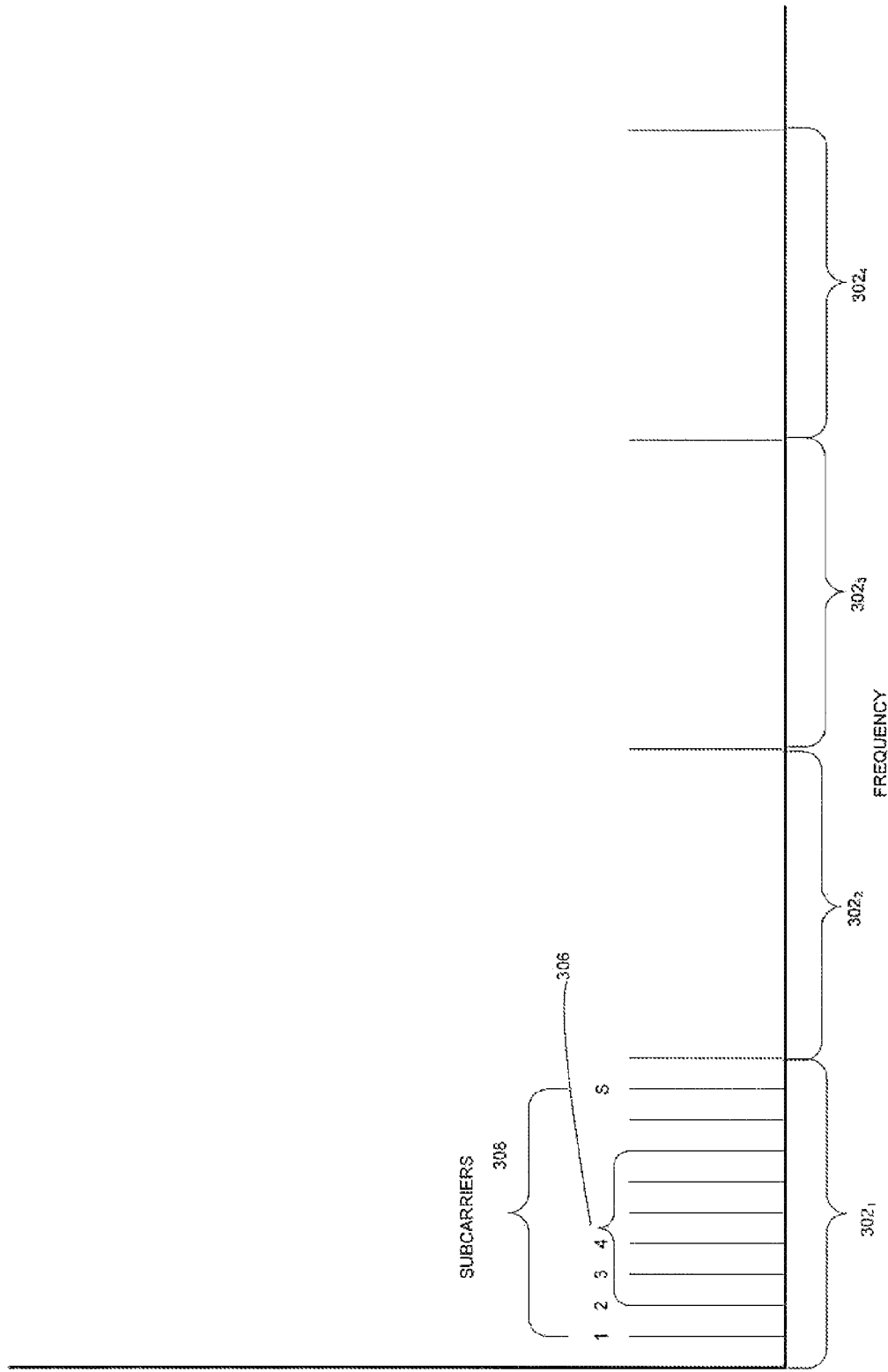
FIG. 2 illustrates aspects of a spectrum allocation.

Referring to FIG. 2, in an OFDM system, for a given bandwidth, for example a 5 MHz bandwidth, an access terminal will decode a signal or signals which may be transmitted on two or more subcarriers 306 of a subcarrier segment $302_1$. The group of subcarriers used for a given transmission to an access terminal, is generally less than all of the subcarriers 308 of segment $302_1$. Thus, a subcarrier set 308 of a given segment $302_N$ allows users to be scheduled on a portion of the entire 5 MHz bandwidth that has better channel quality for the terminal, less traffic, a combination of these, or some other criteria.

In frequency hopping communication, a terminal may be scheduled to hop, in order to provide frequency diversity, over the subcarriers 308 of a segment $302_N$. The frequency hopping may vary on a frame by frame, superframe by superframe, or some other basis. The frequency hopping may include assignment of blocks of contiguous subcarriers, block hopping, or distributed subcarriers, symbol hopping.

Performing frequency hopping within a segment allows the access terminal to calculate its preferred precoding matrix(ces) or vector(s) for a range less than the available bandwidth. This can improve the SNR or other characteristic that is used to calculate the precoding gain.

In an aspect, the segment may be a subband which may comprise a predetermined bandwidth. In an aspect, the subbands may have a bandwidth of 1.25 MHz. Thus, with a usable bandwidth of 5 MHz, there could be up to 4 subbands, per carrier. Although other sizes of usable bandwidth and segments, e.g. subbands, may be utilized. An access terminal operating provides feedback information for a segment may calculate a quality metric, e.g. SNR, that would result in a precoding gain, e.g. due to better frequency coherence, that provides a better signal and potentially increased throughput and signal quality.

In FIG. 2, there are 4 subbands $302_1$-$302_4$, for a 5 MHz deployment. However, the number of subbands may vary, and they need not be the same size. Further, the subbands need not have the same number of subcarriers, and need not comprise adjacent subcarriers.

In further aspects, the segments may be the size of an assignment to the user, e.g. a block of tones and thus the user may report the precoding information for only the subcarriers where it is scheduled. In further aspects, the segments may change over time based upon assignments or other instructions generated at the access point and provided to the terminal.

Figure 3:
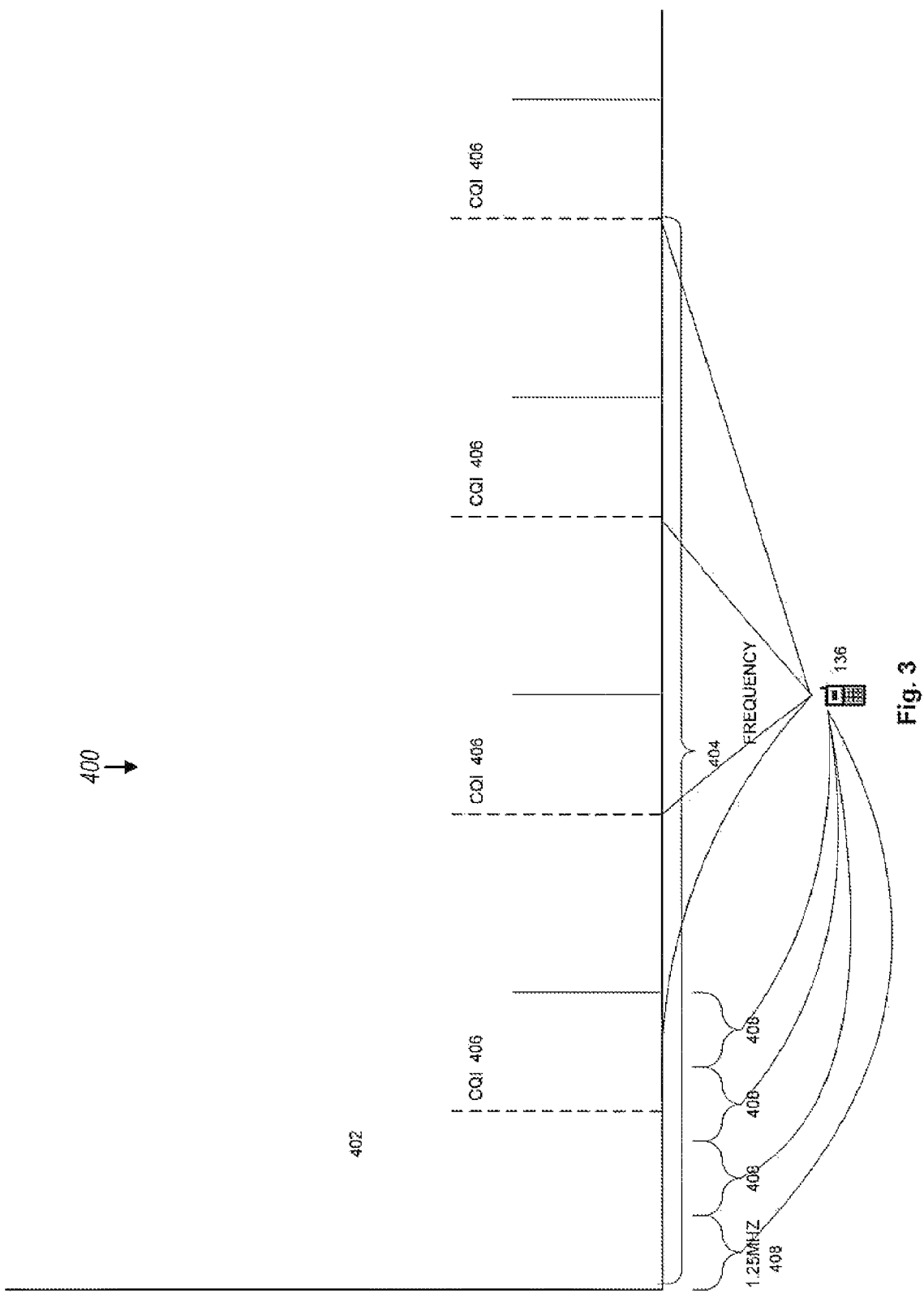
FIG. 3 illustrates aspects of another spectrum allocation.

Referring to FIG. 3, a feedback channel sometimes called a channel quality indication (CQI) channel 406 may be used to provide feedback of preceding, e.g. an index(ces), vector(s), or matrix(ces) along with other CQI type feedback. An access terminal which could use a wider frequency bandwidth, for example, a bandwidth 404, may have at least one CQI transmission channel for each segment. In one aspect, one or more precoding index(ces), vector(s), or matrix(ces) may be reported for multiple segments for a single user, even those on which the user is not scheduled, depending on the structure. That is, if each segment, has its own feedback channel a user may provide feedback, e.g. precoding index(ces), vector(s), or matrix(ces), for each of the segments on its or another segments feedback channel.

The CQI, index(ces) vector(s), or matrix(ces) may be transmitted on a CDM channel in order to multiplex multiple users over the same time-frequency resources and increase bandwidth available for data transmissions. As a result the number of feedback transmissions, which can be sent may be limited by the number of available codes. Thus, when a system is partially loaded, there are codes available to be used as a CQI, and when the system is fully loaded there may be no codes available that can be used as a CQI. Thus, by using the codes available on a partially loaded system a precoding gain is achievable by being able to report feedback in multiple CQI channels for multiple carriers or other segments into which the reverse link bandwidth may be divided. In another aspect, a control channel called reverse subband feedback channel (R-SFCH) is introduced. This channel could be used by the access terminal to indicate the preferred subband.

Figure 4:
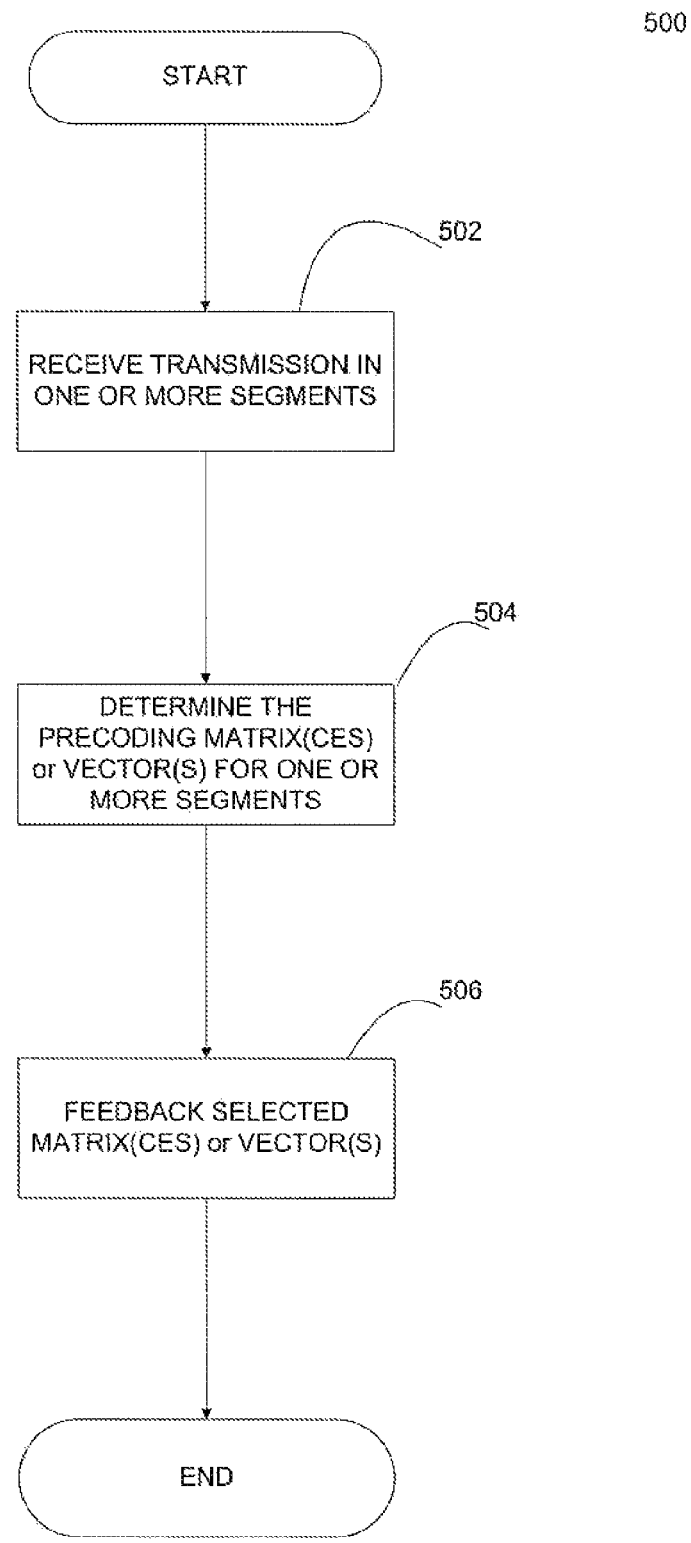
FIG. 4 illustrates a methodology for performing feedback of precoding information for subcarrier segments.

Referring now to FIG. 4, a methodology for illustrates a methodology for performing feedback of precoding information for subbands is illustrated. At 502, an access terminal receives a transmission in a segment. This may be provided by scheduling only portions of a channel tree, or a channel tree that solely, correspond to a segment. Alternatively, the segment may be defined by a preferred set of subcarriers or some other method. At 504, precoding matrix(ces) or vector(s) are determined or calculated. The determination may be based upon a selected CQI-precoding matrix calculation from a look-up table or some other operation. Further, this may be calculated for one or more segment, or only the segment that the terminal is scheduled. This may be determined by the terminal, or part of the assignment or overhead information provide by the access point to the terminal.

At 506, the selected precoding matrix(ces) or vector(s) are feedback to the access point via one or more feedback channels. As discussed above, the feedback channels used may relate to the subband, or subbands, to which the precoding information relate or some other channels.

Figure 5:
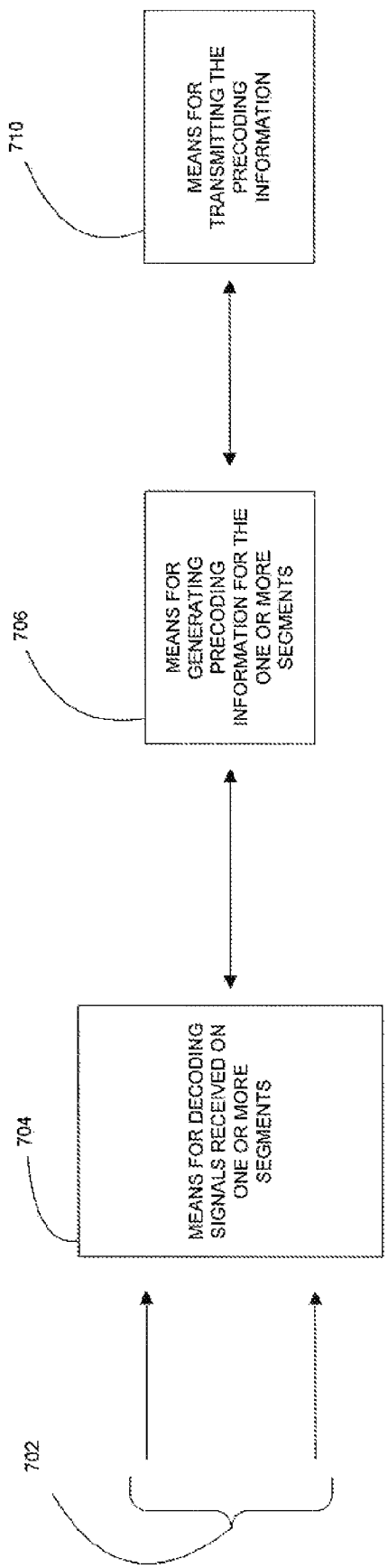
FIG. 5 illustrates an apparatus for reporting precoding information for subcarrier segments.

Referring now to FIG. 5, an apparatus for reporting precoding information for a subband is illustrated. Means 702 for receiving, at an access terminal, a transmission in a segment is provided. This may be provided by scheduling only portions of a channel tree, or a channel tree that solely, correspond to a segment. The means 702 may be in communication with means 704 for determining, or calculating, precoding matrix(ces) or vector(s). The determination may be based upon a selected CQI-precoding matrix calculation from a look-up table or some other operation. Further, this may be calculated for one or more segments, or only the segment that the terminal is scheduled. This may be determined by the terminal, or part of the assignment or overhead information provide by the access point to the terminal.

Means 606, which may be in communication with both means 702 and 704, may transmit the selected precoding matrix(ces) or vector(s) as feedback to the access point via one or more feedback channels. As discussed above, the feedback channels used may relate to the segment, or segments, to which the precoding information relate or some other channels.

Figure 6:
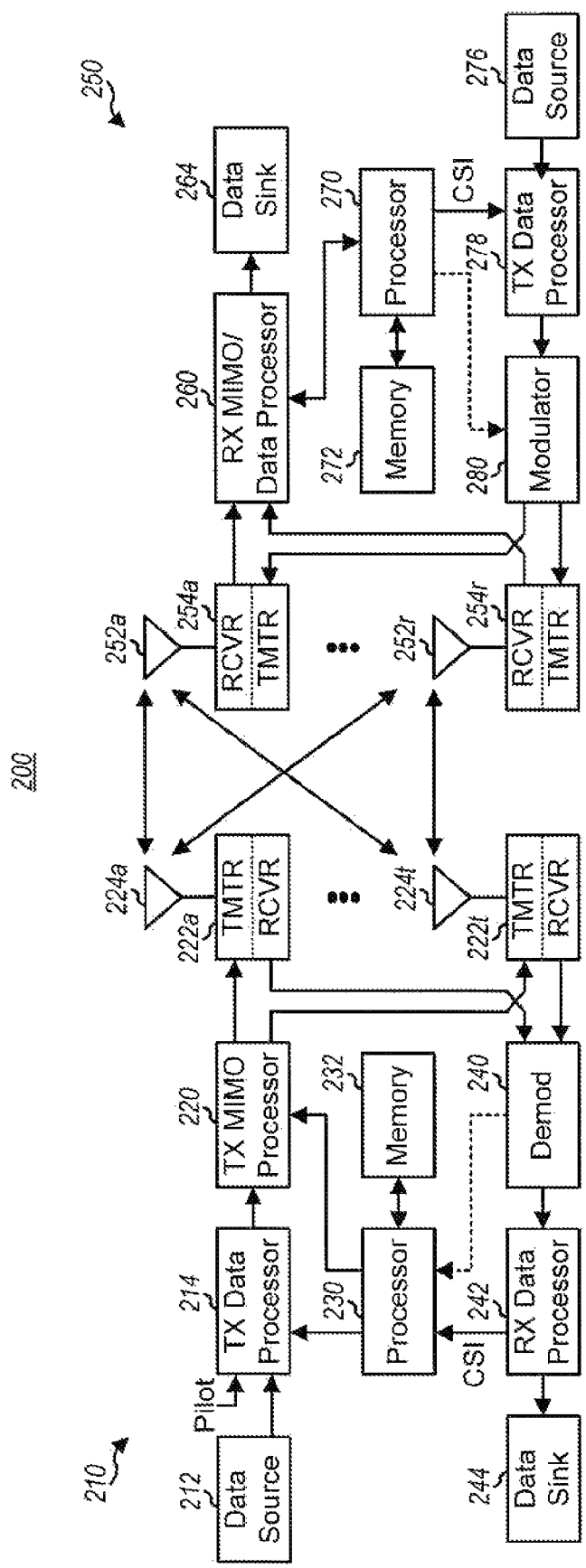
FIG. 6 illustrates aspects of a transmitter and receiver in a multiple access wireless communication system.

Referring to FIG. 6, aspects of a transmitter and receiver in a multiple access wireless communication system 200 is illustrated. At transmitter system 210, traffic data for a number of data streams is provided from a data source 212 to a transmit (TX) data processor 214. In an aspect, each data stream is transmitted over a respective transmit antenna. TX data processor 214 formats, codes, and interleaves the traffic data for each data stream based on a particular coding scheme selected for that data stream to provide coded data. In some aspects, TX data processor 214 applies precoding weights to the symbols of the data streams based upon the user to which the symbols are being transmitted to and the antenna from which the symbols are being transmitted from based on the particular users channel response information. In some aspects, the precoding weights may be generated based upon an index to a codebook generated at the transceiver 254 and provided as feedback to the transceiver 222 which has knowledge of the codebook and its indices. Further, in those cases of scheduled transmissions, the TX data processor 214 can select the packet format based upon rank information that is transmitted from the user.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230. As discussed above, in some aspects, the packet format for one or more streams may be varied according to the rank information that is transmitted from the user.

The modulation symbols for all data streams are then provided to a TX MIMO processor 220, which may further process the modulation symbols (e.g., for OFDM). TX MIMO processor 220 then provides $N_T$ modulation symbol streams to $N_T$ transceivers (TMTR/RCVR) 222a through 222t. In certain aspects, TX MIMO processor 220 applies precoding weights to the symbols of the data streams based upon the channel response information of the user to which the symbols are being transmitted to and the antenna from which the symbol is being transmitted from.

Each transceiver 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective transceiver (RCVR/TMTR) 254. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The processing by RX data processor 260 is described in further detail below. Each detected symbol stream includes symbols that are estimates of the modulation symbols transmitted for the corresponding data stream. RX data processor 260 then demodulates, deinterleaves, and decodes each detected symbol stream to recover the data for the data stream. The processing by RX data processor 260 is complementary to that performed by TX MIMO processor 220 and TX data processor 214 at transmitter system 210.

The channel response estimate generated by RX processor 260 may be used to perform space, space/time processing at the receiver, adjust power levels, change modulation rates or schemes, or other actions. RX processor 260 may further estimate the signal-to-noise-and-interference ratios (SNRs) of the detected symbol streams, and possibly other channel characteristics, and provide these quantities to a processor 270. RX data processor 260 or processor 270 may further derive an estimate of the "operating" SNR for the system. Processor 270 then provides estimated channel state information (CSI), which may comprise various types of information regarding the communication link and/or the received data stream. For example, the CSI may comprise only the operating SNR. The CSI is then processed by a TX data processor 278, which also receives traffic data for a number of data streams from a data source 276, modulated by a modulator 280, conditioned by transceivers 254a through 254r, and transmitted back to transmitter system 210.

In addition, processor 270 may select the index(ces) or entry(ies) that correspond to the matrix(ces) or vector(s) that provide some desired channel conditions, e.g. SNR, for the transceiver 254 based upon the signals received by the receiver. Processor 270 can quantize the index or entry according to a codebook that is known at transceiver 222. In some aspects, as described with respect to FIG. 2, five-bit codes may be utilized allowing a wide range of feedback. The codebook size and entries can vary per device, per sector, per cell, or per system and may be updated over time based upon communication channel conditions, system updates, or the like.

At transmitter system 210, the modulated signals from receiver system 250 are received by antennas 224, conditioned by transceivers 222, demodulated by a demodulator 240, and processed by a RX data processor 242 to recover the CSI reported by the receiver system. The reported CSI is then provided to processor 230 and used to (1) determine the data rates and coding and modulation schemes to be used for the data streams and (2) to generate various controls for TX data processor 214 and TX MIMO processor 220.

Further, processor 270 may perform all or some of the functions discussed with respect to FIGS. 1-5 with respect to the access terminal.

The techniques described herein may be implemented by various means. For example, these techniques may be implemented in hardware, software, or a combination thereof. For a hardware implementation, the processing units (e.g., processors 230 and 270, TX and RX processors 214, 242, 260 and 278, and so on) for these techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that include the instructions that may be implemented by one or more processors to perform the functions described herein. The instructions may be stored in memory units, e.g., memory 272 in FIG. 6, on a removable media, or the like that may be read and executed by one or more processors (e.g., controllers 270). The memory unit(s) may be implemented within the processor or external to the processor, in which case it can be communicatively coupled to the processor via various means as is known in the art. The memory may also be implemented within the processor or external to the processor, stored in an external memory, in a computer program product, e.g. a cd-rom or other media, be in a memory at an external server, or the like.

While FIG. 6 discusses a MIMO system, the same system may be applied to a multi-input single-output system where multiple transmit antennas, e.g. those on a base station, transmit one or more symbol streams to a single antenna device, e.g. a mobile station. Also, a single output to single input antenna system may be utilized in the same manner as described with respect to FIG. 6.

It should be noted that the concept of channels herein refers to information or transmission types that may be transmitted by the access point or access terminal. It does not require or utilize fixed or predetermined blocks of subcarriers, time periods, or other resources dedicated to such transmissions.

The previous description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the principles and novel features disclosed herein.

What is claimed is:

1. A wireless communication apparatus comprising:
a processor configured to decode signals that are received over two or more subcarriers of a segment of subcarriers, which is one of a plurality of segments of subcarriers available for communication, and to provide precoding weights for at least one segment of the plurality of segments based on the received signal, wherein the precoding weights are applied to at least one symbol of at least one data stream based upon at least one channel response information of a user and wherein the at least one segment is a subband which comprises a predetermined bandwidth; and a transmitter configured to transmit the precoding weights, wherein each segment of subcarriers of the plurality of segments of subcarriers has its own feedback channel, and wherein the transmitter is configured to feedback to a receiver the precoding weights for each of the at least one segment on the segment's own feedback channel.

2. The wireless communication apparatus of claim 1, wherein the processor is configured to provide the precoding weights as a precoding index.

3. The wireless communication apparatus of claim 2, wherein the processor is configured to determine a signal to noise ratio and select, to provide, a precoding index as a function of the signal to noise ratio.

4. The wireless communication apparatus of claim 1, wherein the processor is configured to provide precoding weights for at least one other segment of subcarriers in addition to the segment including the one or more subcarriers.

5. The wireless communication apparatus of claim 1, wherein the segment comprises a subband.

6. A wireless communication method comprising:
receiving signals over two or more subcarriers of a segment of subcarriers, which is one of one or more segments of subcarriers;
generating precoding weights for at least one segment of the one or more segments, based upon the received signal, wherein the precoding weights are applied to at least one symbol of at least one data stream based upon at least one channel response information of a user and wherein the at least one segment is a subband which comprises a predetermined bandwidth; and
transmitting the precoding weights, wherein each segment of subcarriers of the one or more segments of subcarriers has its own feedback channel, and wherein the transmitter is configured to feedback to a receiver the precoding weights for each of the at least one segment on the segment's own feedback channel.

7. The method of claim 6 wherein generating comprises generating the precoding weights as a precoding index.

8. The method of claim 7, wherein generating comprises determining a signal to noise ratio and selecting a precoding index as a function of the signal to noise ratio.

9. The method of claim 6, wherein generating comprises generating precoding weights for at least one other segment of subcarriers in addition to the segment including the one or more subcarriers.

10. The method of claim 6, wherein the segment comprises a subband.

11. A wireless communication device comprising:
means for receiving signals over two or more subcarriers of a segment of subcarriers, which is one of one or more segments of subcarriers;
means for generating precoding weights for at least one segment of the one or more segments, based upon the received signal, wherein the precoding weights are applied to at least one symbol of at least one data stream based upon at least one channel response information of a user and wherein the at least one segment is a subband which comprises a predetermined bandwidth; and
means for transmitting the precoding weights, wherein each segment of subcarriers of the one or more segments of subcarriers has its own feedback channel, and wherein the transmitter is configured to feedback to a receiver the precoding weights for each of the at least one segment on the segment's own feedback channel.

12. The wireless communication apparatus of claim 11, wherein generating comprises generating the precoding weights as a precoding index.

13. The wireless communication apparatus of claim 12, wherein generating comprises determining a signal to noise ratio and selecting a precoding index as a function of the signal to noise ratio.

14. The wireless communication apparatus of claim 11, wherein generating comprises generating precoding weights for at least one other segment of subcarriers in addition to the segment including the one or more subcarriers.

15. A non-transitory computer-readable medium storing a computer program, wherein execution of the computer program is for:
receiving signals over two or more subcarriers of a segment of subcarriers, which is one of one or more segments of subcarriers;
generating precoding weights for at least one segment of the one or more segments, based upon the received signal, wherein the precoding weights are applied to at least one symbol of at least one data stream based upon at least one channel response information of a user and wherein the at least one segment is a subband which comprises a predetermined bandwidth; and
transmitting the precoding weights, wherein each segment of subcarriers of the one or more segments of subcarriers has its own feedback channel, and wherein the transmitter is configured to feedback to a receiver the precoding weights for each of the at least one segment on the segment's own feedback channel.

* * * * *